US008149936B2

(12) United States Patent
Koslov et al.

(10) Patent No.: US 8,149,936 B2
(45) Date of Patent: Apr. 3, 2012

(54) APPARATUS AND METHODS FOR TILE AND ASSIGNMENT PROCESSING

(75) Inventors: Joshua Lawrence Koslov, Hopewell, NJ (US); Irv Negrin, Ringwood, NJ (US); Jingyuan Liu, Morris Plains, NJ (US); Niranjan N. Ratnakar, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 12/412,362

(22) Filed: Mar. 27, 2009

(65) Prior Publication Data

US 2009/0245434 A1    Oct. 1, 2009

Related U.S. Application Data

(60) Provisional application No. 61/041,293, filed on Apr. 1, 2008.

(51) Int. Cl.
*H04K 1/10* (2006.01)
(52) U.S. Cl. ........................ 375/260; 370/209
(58) Field of Classification Search .................. 375/260; 370/209–210
See application file for complete search history.

(56) References Cited

U.S. PATENT DOCUMENTS

| 7,590,045 | B2 * | 9/2009 | Oh et al. | 370/210 |
| 2007/0195899 | A1 | 8/2007 | Bhushan et al. | |
| 2010/0265898 | A1 * | 10/2010 | Chun et al. | 370/329 |

OTHER PUBLICATIONS

Eduard Jorswieck; Walid Ben Chamekh; Martin Weckerle Ed—Carlos Ubeda Castellanos; Dimas Lopez Villa; Oumer M Teyeb; Jan Elling;: "Optimal Chunk Processing for Multi-User MIMO OFDM Wireless Systems" Personal, Indoor and Mobile Radio Communications, 2006 IEEE 17th Inter National Symposium on, IEEE, Pl, Sep. 1, 2006, pp. 1-5, XP031023660 ISBN: 9781424403295 the whole document.

Wei Han; Ying Yi; Muir M; Nousias I; Tughrul Arslan; Edorgan A T Ed—Anonymous: "Efficient Implementation of Wireless Applications on Multi-core Platforms Based on Dynamically Reconfigurable Processors" Complex, Intelligent and Software Intensive Systems, 2008. CISIS 2008. International Conference on, IEEE, Piscataway, NJ, USA, Mar. 4, 2008, pp. 837-842, XP031312245 ISBN: 9780769531090 Chapters 2. and 4.

* cited by examiner

*Primary Examiner* — Emmanuel Bayard
(74) *Attorney, Agent, or Firm* — Stanton Braden

(57) ABSTRACT

Disclosed are methods and apparatus for synchronizing tile processing and assignment processing in a communication device. In particular, the methods and apparatus utilize a tile processing scorecard with a number of assertable bits corresponding to a number of tiles to be tile processed. As each tile is tile processed, the scorecard or bit indicators are asserted to indicate that the tile has been processed. Assignment jobs, which involve codewords having information from symbols in multiple tiles are processed after all of the pertinent tiles are tile processed. The scorecard information is accessible for assignment processing to determine which tiles have been processed, thus affording synchronization of tile processing with assignment processing, while maximizing the independence of these two processing operations. Tile processing operations may further use the scorecard information to prioritize or order tile processing in relation to known queued assignment jobs.

36 Claims, 7 Drawing Sheets

APPARATUS AND METHODS FOR TILE AND ASSIGNMENT PROCESSING

CLAIM OF PRIORITY UNDER 35 U.S.C. §119

The present Application for Patent claims priority to Provisional Application No. 61/041,293 entitled "TILE AND ASSIGNMENT PROCESSING" filed Apr. 1, 2008, and assigned to the assignee hereof and hereby expressly incorporated by reference herein.

BACKGROUND

1. Field

The present disclosure relates generally to apparatus and method for tile and assignment processing, and more specifically to accounting for tiles that have been processed with tile based processing in order to synchronize tile based processing with assignment based processing for improved performance.

2. Background

In communication systems, modulation symbols are processed in regions of frequency and time. In some communication systems such as orthogonal frequency division multiplexed (OFDM) systems, as an example, these regions may be divided into what are termed "tiles," which are contiguous regions of frequency and time. For example, a tile might comprise 16 subcarrier frequencies over eight time sequential OFDM symbols.

In OFDM systems such as Ultra Mobile Broadband (UMB) as an example, resource assignments allocated to mobile stations for uplink are normally divided among various tiles. Resource assignment processing of received OFDM signals is performed in units of codewords in preparation of error correcting decoding. However, because OFDM symbols are scanned in frequency, rather than time order (i.e., symbols), modulation or tile processing of all of the various tiles that may carry information for a single codeword (or, in UMB, a sub-packet) need to be processed through channel estimation and signal maximizing or noise filtering through techniques such as maximum ratio combining (MRC) or minimum mean square error (MMSE) prior to assignment processing. Additionally, in some systems any given tile may contain portions of multiple sub-packets and may contain more than one layer from respective mobile units, where multiple layers are identical regions of frequency and time that are separable at the receiver using MIMO (multi-input multi-output) transmission techniques. Thus, a tile for one assignment processing of one layer may also be needed for another assignment processing of another layer, which could result in the duplication of tile processing. Therefore, the determination of which tiles need to be tile processed in order to process a particular sub-packet on a particular layer becomes complicated. Accordingly, a need exists to synchronize or coordinate tile and assignment processing in order to optimize processing and avoid duplicate processing of tiles.

SUMMARY

According to an aspect, a method for communication between tile processing and assignment processing operations in a communication device is disclosed. The method includes processing a plurality of tiles among which assignment jobs are divided, wherein at least one assignment job codeword is comprised from at least a portion of the plurality of tiles. The method further includes asserting bit indicators corresponding to respective tiles from the plurality of tiles when the respective tiles have been processed, and determining during assignment processing of at least one resource assignment job whether bit indicators corresponding to tiles within the at least one assignment job have been asserted. Additionally, the method includes processing the assignment job when all bit indicators corresponding to the tiles within the at least one assignment job have been asserted.

According to another aspect, an apparatus for synchronizing tile processing and assignment processing in a communication device is disclosed. The apparatus includes at least one tile processing unit configured to tile process one or more tiles of a plurality of received tiles, and at least one assignment processing unit configured to process assignment jobs wherein at least one assignment job codeword is comprised from at least a portion of processed ones of the plurality of tiles. The apparatus also includes a tile processing scorecard having a plurality of assertable bit indicators: wherein each bit indicator in the tile processing scorecard is assigned to a corresponding tile that is processed by the at least one tile processing unit, and is assertable by the at least one tile processing unit when the at least one tile processing unit processes the tile. Additionally, the one or more of plurality of bit indicators are accessible by the at least one assignment processing unit to determine whether particular tiles have been processed by the at least one tile processing unit, such that when tiles associated with an assignment job are determined to have been processed by the at least one tile processing unit, then the at least one assignment processing unit may initiate processing of the assignment job.

In another aspect, an apparatus for synchronizing tile processing and assignment processing operations in a communication device is disclosed. The apparatus includes means for processing a plurality of tiles among which assignment jobs are divided, wherein at least one assignment job codeword is comprised from at least a portion of the plurality of tiles. Means for asserting bit indicators corresponding to respective tiles from the plurality of tiles when the respective tiles have been processed is also included in the apparatus. Further, the apparatus includes means for determining during assignment processing of at least one resource assignment job whether bit indicators corresponding to tiles within the at least one assignment job have been asserted, and means for processing the assignment job when all bit indicators corresponding to the tiles within the at least one assignment job have been asserted.

In still one further aspect, a computer program product comprising a computer-readable medium is disclosed. The computer-readable medium includes code for causing a computer to process a plurality of tiles among which assignment jobs are divided received by a communication device operable in a communication system, wherein at least one assignment job codeword is comprised from at least a portion of the plurality of tiles. The computer-readable medium also includes code for causing a computer to assert bit indicators corresponding to respective tiles from the plurality of tiles when the respective tiles have been processed. Furthermore, the computer-readable medium includes code for causing a computer to determine during assignment processing of at least one resource assignment job whether bit indicators corresponding to tiles within the at least one assignment job have been asserted, and code for causing a computer to process the assignment job when all bit indicators corresponding to the tiles within the at least one assignment job have been asserted.

BRIEF DESCRIPTION OF THE DRAWINGS

It is noted that like numerals refer to like parts throughout the several views of the drawings.

DETAILED DESCRIPTION

Figure 1:
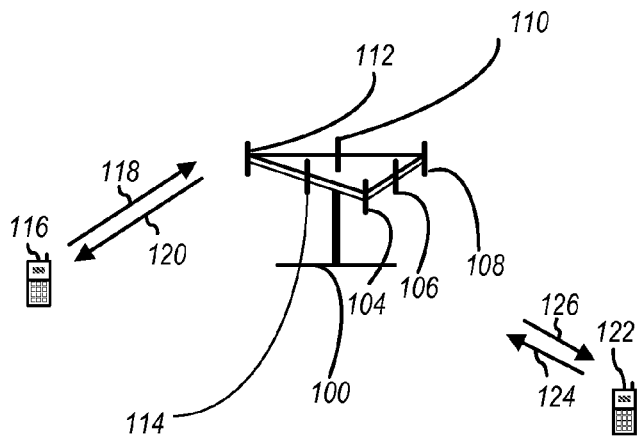
FIG. 1 illustrates an example of a multiple access wireless communication system.

According to the present disclosure, methods and apparatus are disclosed for synchronizing the modulation or tile-based processing and the assignment-based processing that also affords maximization of the independence of these two types of processing, and allowing for architectures involving multiple modulation or tile processors for improved performance.

In an aspect, the disclosed methods and apparatus employ a tile processing scorecard having bits that may be used to respectively represent one physical tile within a frame of tiles. As each corresponding bit in the tile scorecard is asserted, the state of the tile processing can be continuously accounted for and examined to determine if the tiles corresponding to a current or multiple pending assignment jobs have been processed. In this way, tile processing may be synchronized with assignment processing, while still allowing the tile and assignment processing to maintain independence from one another. When the needed tiles are available for an assignment job, as determined from examination of the tile processing scorecard, the assignment job is performed. Because both the tile and assignment processors may access this tile processing scorecard, it can also be used as a more general mechanism where multiple tile processing engines can be configured to divide the tile processing tasks for greater speed, or where multiple assignment processing engines divide the assignment processing tasks.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Ultra Mobile Bandwidth (UMB), Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for UMB, and UMB terminology is used in much of the description below.

Although the invention is described for use in UMB systems, the disclosed concepts apply to other communication systems in which operations are cascaded. For example, the disclosed concepts may apply to other systems in which regions different from tiles are processed prior to decoding or other operations, or where multiple codewords are used per assignment such as in LTE. Furthermore, as discussed above the presently disclosure need not be limited to OFDM-based systems such as UMB.

Referring to FIG. 1, an example of a multiple access wireless communication system in which the present methods and apparatus may be employed is shown. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over a downlink or forward link 120 and receive information from access terminal 116 over an uplink or reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In an aspect, antenna groups each are designed to communicate to access terminals in a sector of the areas covered by access point 100.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
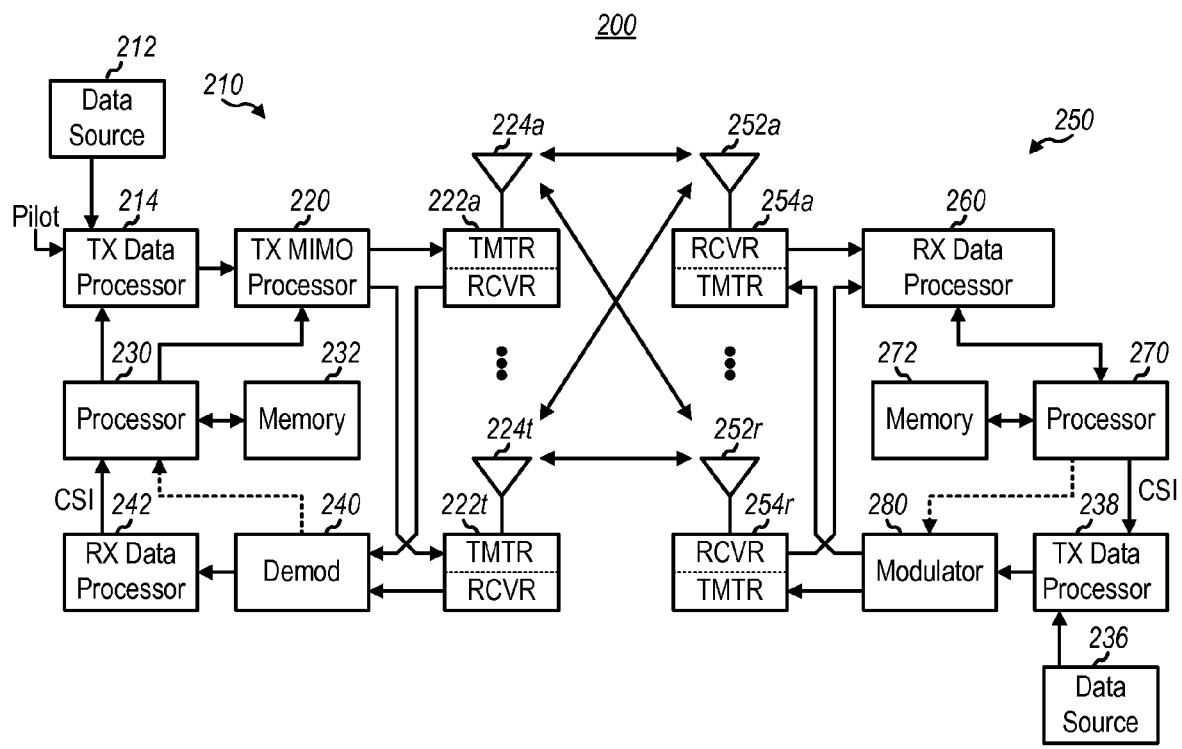
FIG. 2 is a block diagram of a communication system.

FIG. 2 is a block diagram of an example of a transmitter system 210 (also known as the access point) and a receiver system 250 (also known as access terminal) in a MIMO system 200 that provides spatial diversity multiplexing. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped)

based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
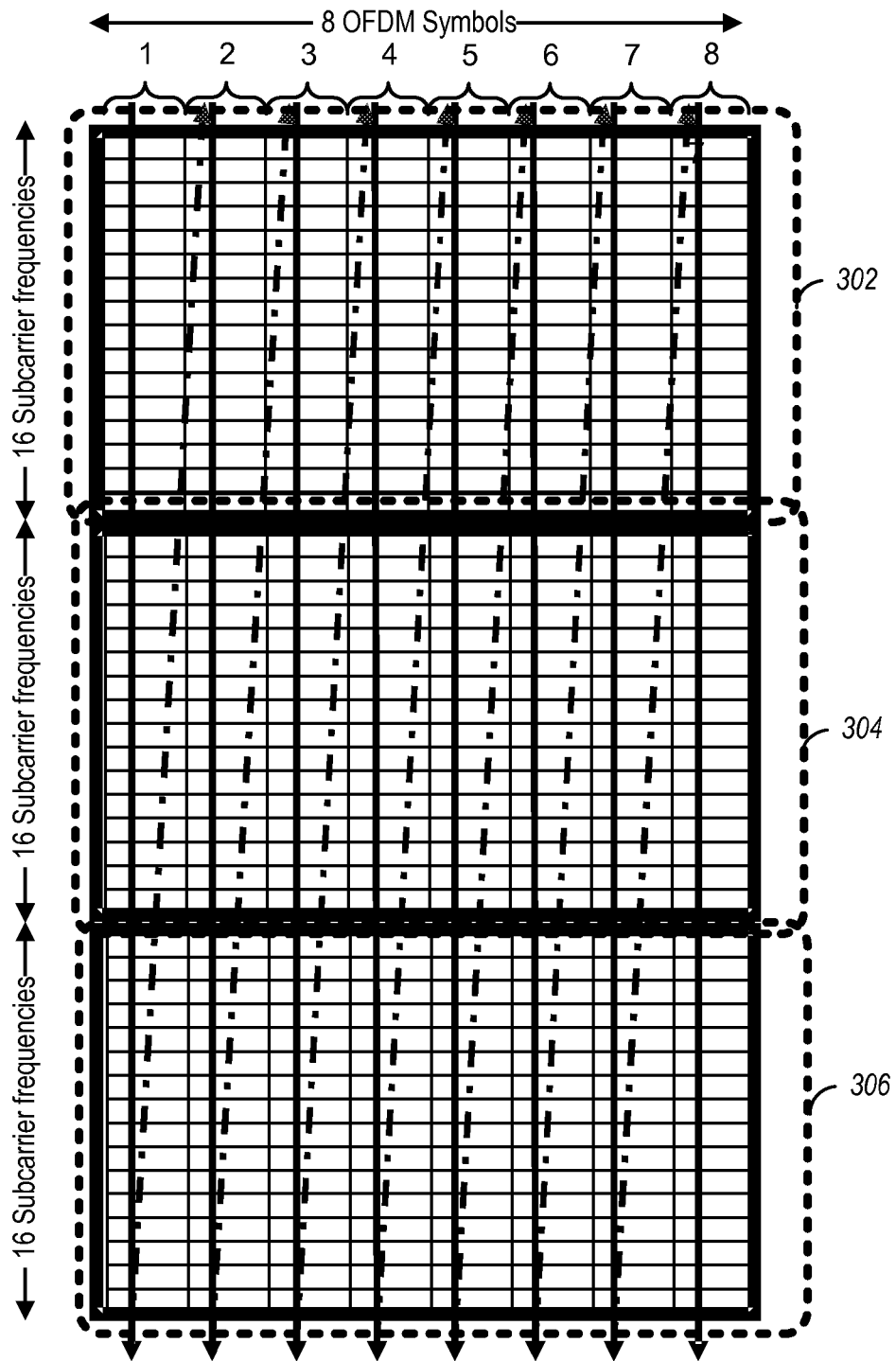
FIG. 3 illustrates the arrangement of tiles across frequency and time regions for a communication signal.

FIG. 3 shows an example of a portion of an OFDM frame separated into tiles, and frequency order of reading such tiles. As illustrated in this example, a logical tile 302 is a contiguous region of frequency and time, which is shown to contain 16 subcarriers or tones across eight (8) OFDM symbols. It is noted that the tile 302 is termed a "logical tile" to exemplify certain communication systems, such as UMB, where the original physical tiles could be frequency hopped for transmission diversity.

Accordingly, the received tile ordering is not necessarily same as the original tile ordering (i.e., the physical tile ordering). This hopping is only exemplary of certain types of communication systems, such as UMB.

For the sake of brevity in this example, only three logical tiles 302, 304, and 306 are shown in FIG. 3. Since OFDM symbols are received in time sequence, the frequency data for each subcarrier in the symbol is scanned and processed in a prescribed order as illustrated by vertical arrow 308. Thus, the subcarriers across logical tiles 302, 304, and 306 for a first OFDM symbol are scanned prior to a next symbol. It is evident then that portions of multiple tiles will be processed before the entire tile has been processed. After the frequency order processing of the first OFDM symbol, processing then next begins with the first subcarrier of the next symbol as illustrated by dashed arrow 310. This procedure repeats until the tiles are completely scanned (i.e., all subcarriers of all 8 OFDM symbols are scanned).

It is also noted here that the example of FIG. 3 is described in terminology pertaining to UMB; namely the term "tile." In LTE systems, for example, the conceptual equivalent to the tile concept is termed "resource block." Thus, in the following description tile processing components and operations may be applied to aspects of resource block processing in LTE systems. Although other systems may use different terminology, the presently disclosed concepts are applicable to any system having cascaded operation, such systems having frequency and/or time regions that are processed (e.g., demodulation) prior to decoding or other operations.

Figure 4:
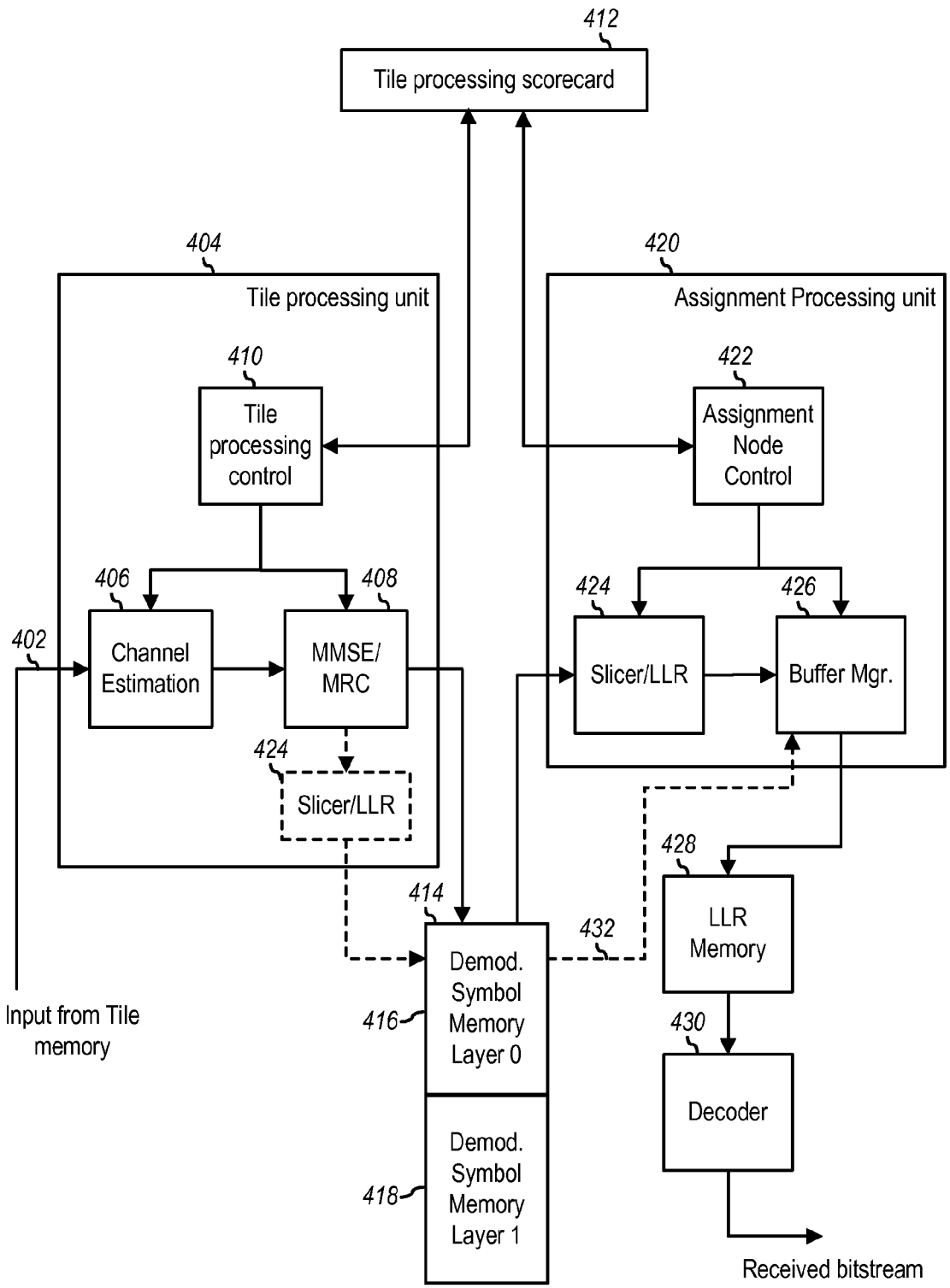
FIG. 4 is block diagram of an apparatus for demodulation and decoding of communication signals that employs a mechanism to synchronize tile and assignment processing.

FIG. 4 illustrates an apparatus 400 for demodulation and decoding of communication signals that employs a mechanism to synchronize tile and assignment processing. As merely an example, apparatus 400 may be employed in a base station, such as the transmitter system 210, and more particularly associated with the demodulator 240 and RX Data processor 242 portions of transmitter system 210. As another example, the apparatus 400 could also be employed in a mobile station, such as receiver system 250, and more particularly RX data processor 260.

Apparatus 400 receives data and pilot samples input from a tile memory as shown by input 402. The input 402 is fed to a tile processing unit 404, which demodulates the input signal among other things. Processing unit 404 may specifically include a channel estimation block 406, which receives the samples from input 402 and performs channel estimation using the pilot tones in the input samples. The data is also fed to a block 408 for performing at least one of MMSE, MRC, LLSE or other processes to eliminate noise and/or enhance detection of the received signal, including separating MIMO layers, where applicable. Both channel estimation block 406 and MMSE/MRC block 408 are linked with a tile processing control 410, which directs processing of tiles among the input samples and also keeps account of which tiles have been processed.

Figure 5:
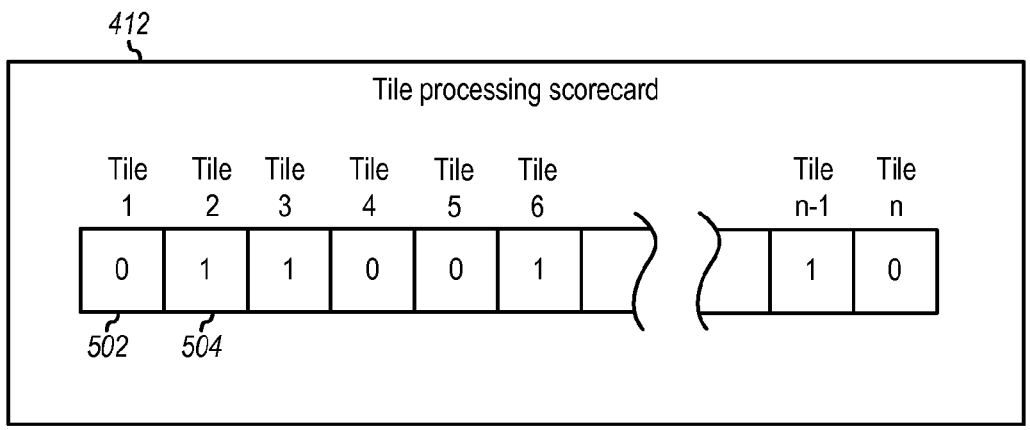
FIG. 5 illustrates an exemplary tile processing scorecard.

As part of the accounting of which tiles have been tile processed, apparatus 400 may include a tile processing scorecard 412 that is communicatively coupled with processing control 410. Tile processing scorecard 412 is used to keep an accounting of which physical tiles within a frame have been processed by tile processing unit 404 and is thus a mechanism to synchronize tile and assignment processing. In one example, which is illustrated in FIG. 5, the tile processing scorecard may be configured as a bit register having an n number of assertable bit entries or fields corresponding to an n number of tiles within a frame. When a physical tile is processed by unit 404, tile processing control 412 then directs a bit corresponding to that physical tile in the scorecard to be asserted (i.e., changed from a state indicating that tile was not processed such as "0" or "low" to a state indicating that tile has been processed such a "1" or "high"). As an illustration in FIG. 5, a first bit field 502 corresponding to physical tile 1 is shown at state "0" indicating that the tile has not been processed, whereas another bit field 504 has been asserted to a state of "1" indicating that a physical tile 2 has been processed. Tile processing scorecard 412 may be implemented as a hardware register, as described. Alternatively, however, one skilled in the art will appreciate that scorecard 412 may also be implemented by firmware in an ASIC, as well as software stored in memory and run by a processor.

Turning back to FIG. 4, apparatus 400 also includes a memory 414 that receives and store demodulated symbols processed by tile processing unit 404. The example of FIG. 4 also illustrates that the demodulated symbol memory 414 may be configured to store demodulated symbols according to different layers in a MIMO system. In particular, memory 414 may be functionally partitioned to store symbols corresponding to a layer 0 (416) and a layer 1 (418). The symbols stored in memory 414 are read out by an assignment processing unit 420, which processes the symbols stored in memory 414 based on assignment jobs to reassemble codewords to be decoded Assignment processing unit 420 includes an assignment node control unit 422 that is configured to communicate with the tile processing scorecard 412. Unit 422, in one aspect, may access scorecard 412 to determine if tiles in each particular assignment job have been processed. Assignment node control unit 422 directs a slicer/LLR unit (LLR meaning log likelihood ratio) to read symbols from memory 414 and assemble the code words. Additionally, unit 420 may include a buffer manager 426 that manages storage of the codewords in an LLR memory 428. Codewords are read out of LLR memory 428 to decoder 430 for recovery of the received bitstream, which may then further utilized by other portions of the communication device (not shown) in which apparatus 440 is utilized.

It should be noted that, in an alternative implementation, slicing/LLR generation may be performed within the tile processing unit 404. In such a case tile processing unit 404 would contain slicer/LLR unit 424 (indicated with dashed lines as an alternative aspect), which is fed by MMSE/MRC unit 408. Accordingly, memory 414 would contain LLR values, rather than demodulated symbol values; and assignment processing unit 420 would no longer contain slicer/LLR unit 424. Furthermore, buffer manager 426 would be coupled directly with memory 414 (as indicated by alternative coupling 432), while keeping its same connection with LLR memory 428, which acts as an input buffer for decoder 430.

Tile processing scorecard 412 may be configured to provide a bit field for each of the physical tiles in received frame (i.e., a frame being a predefined number of OFDM symbols). After all tiles in the frame have been tile processed and a next frame begins input to tile processing unit 404, the tile processing scorecard 412 is reset so that all bit fields indicate no tile has yet been processed. This reset may be performed by the tile processing control 404, firmware controlling scorecard 412, or by another device such as a DSP (not shown) as examples. Additionally, it is noted that the example of FIG. 5 is merely exemplary, and the scorecard may be configured to further account for subtiles (i.e., a portion of a tile) or any other divisions of frequency and time regions of a received signal.

Figure 6:
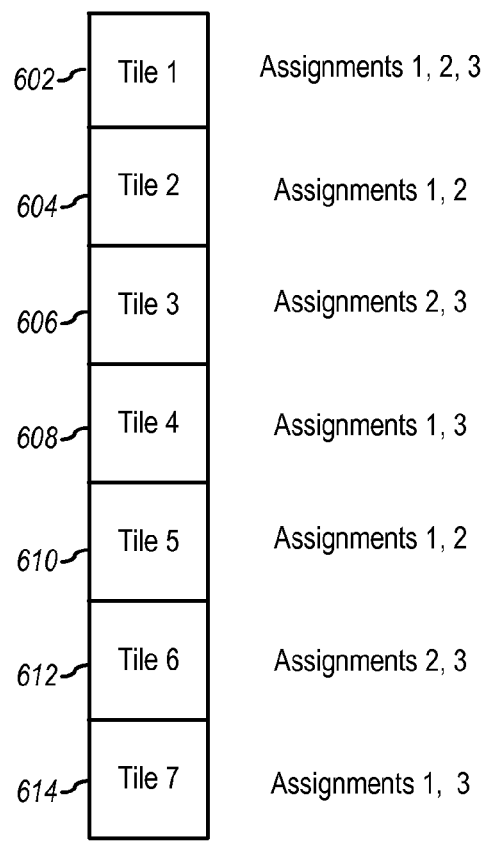
FIG. 6 is an illustration of tiles and how tiles correlate to assignments in a communication system

In an aspect, tile processing scorecard 412 may also be used by tile processing control 410 to order tile processing for more efficient processing of assignment jobs allowing the decoder to remain busy more of the time. Referring to FIG. 6, a number of tiles numbered 1-7 and corresponding assignment jobs are illustrated. Specifically, illustrated beside each tile are assignment job numbers corresponding to tiles that have at least portions of codewords that need to be tile processed before the assignment job can be processed. For example, an assignment job 1 is mapped to Tile 1 (602), Tile 2 (604), Tile 4 (608), Tile 5 (610), and Tile 7 (614). Thus, to process assignment job 1, these five tiles all must be tile processed before the assignment job can begin. Additionally, in the system of FIG. 4, after assignment job 1 is started processing, the bit fields in scorecard 412 will have been asserted to indicate that Tiles 1, 2, 3, 5, and 7 have been tile processed.

As further shown in FIG. 6, another assignment job 2 is mapped to Tile 1 (602), Tile 2 (604), Tile 3 (606), Tile 5 (610), and Tile 6 (612). If assignment job 2 succeeds assignment job 1, it can be determined easily from scorecard 412 that Tiles 1, 2, and 5 were already processed for assignment job 1. Accordingly, the assignment processing unit can determine that these demodulated tiles are already present in memory 414. This is significant in that tile processing unit 404 may utilize the bit information in scorecard 412 to avoid reprocessing Tiles 1, 2, and 5 for assignment job 2, as they were already processed for assignment job 1 thereby optimizing processing efficiency.

As may be seen in the example of FIG. 6, when assignment processing unit 420 begins processing for assignment job 3, all of the tiles for job 3 have already been processed (i.e., Tiles 1, 3, 4, 6, and 7) and assignment job 3 processing can begin immediately without any further tile processing. A significance here is that the tile processing unit 404 may further utilize the information in scorecard 412 to prioritize the ordering of tile processing to reduce delays in assignment processing by taking advantage of tiles having shared job assignments and having already been processed. Thus tile processing may be reordered based on which tiles have been already been processed as determined from scorecard 412.

Figure 7:
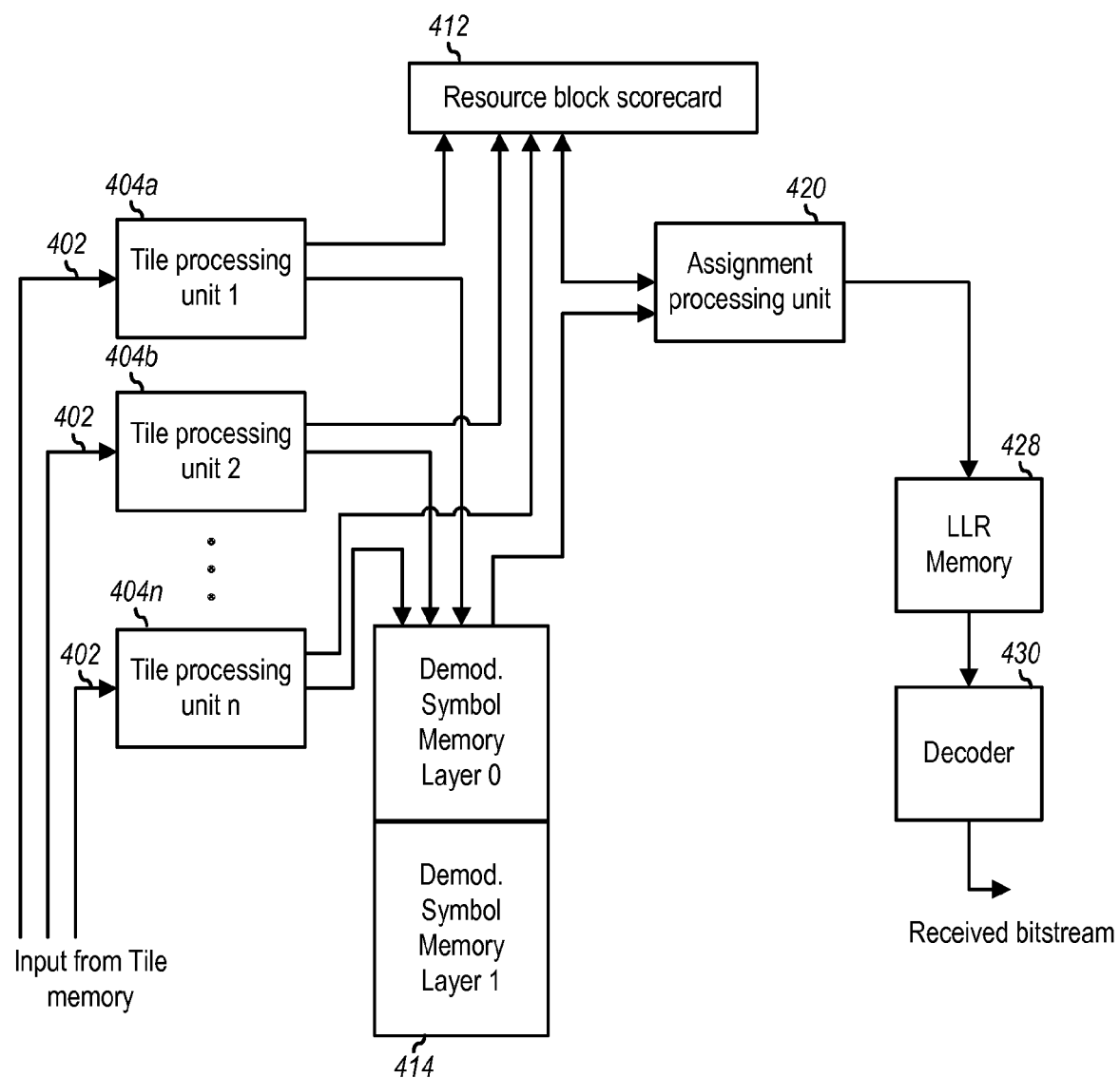
FIG. 7 is an illustration of an alternative arrangement of the apparatus of FIG. 4 with multiple tile processing units.

FIG. 7 is an illustration of an alternative arrangement of the apparatus of FIG. 4. In this example, the number of tile processing units 404 may be multiplied such that an n number of processing units 404a through 404n are utilized to further increase tile processing efficiency through parallel processing. Each of the units 404a through 404n are communicatively coupled to scorecard 412 to assert bits in the bit fields therein when that processing unit processes a tile in the frame. The scorecard 412 in this instance is useful to ensure each tile is only processed once across the units 404a through 404n. Although not shown, one skilled in the art will also appreciate that multiple assignment processing units may be employed as well, with the tile scorecard 412 affording ease of determining by multiple assignment processing units which tiles have been processed.

Figure 8:
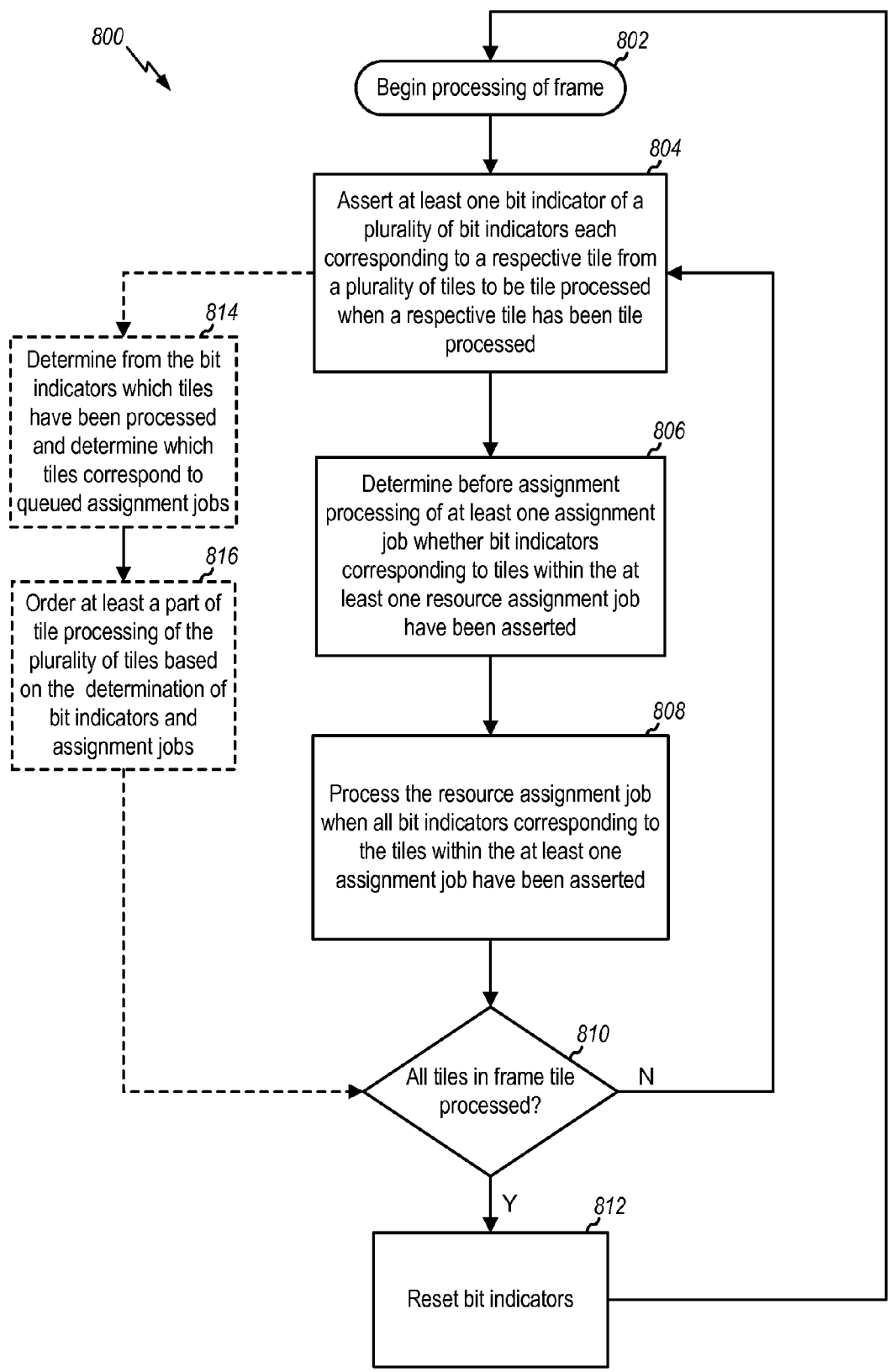
FIG. 8 illustrates a flow diagram of a method for tile and assignment processing that effect synchronization between the two types of processing

FIG. 8 illustrates a flow diagram of a method for tile and assignment processing that effects synchronization between the two types of processing. As shown, method 800 includes a first process in block 802 where processing of a frame is started, the processing including tile processing of a plurality of tiles among which assignments are divided, wherein at least one codeword is comprised from at least a portion of the plurality of tiles. Block 802 may also include assignment processing of processed tiles, such as the operation of processing unit 420 processing demodulated symbols (i.e., processed tiles) stored in memory 414. At block 804, at least one bit indicator is asserted from a plurality of bit indicators where each of the bit indicators each corresponding to a respective tile from a plurality of tiles to be tile processed when a respective tile has been tile processed. As an example, tile processing unit 404 and tile processing scorecard 412 may implement the processes of blocks 802 and 804. In a more specific example, the processes of block 802 and 804 may be effected by channel estimation unit 406, MMSE/

MRC unit 408, and tile processing control 410, which asserts bit indicators in tile processing scorecard 412.

Block 806 includes a process of determining before assignment processing of at least one assignment job whether bit indicators corresponding to tiles within the at least one resource assignment job have been asserted. According to an aspect, the process in block 806 may be implemented by assignment processing unit 420, and more specifically node control 422 accessing tile processing scorecard 412. It is noted that although block 806 is shown sequential to blocks 802 and 804 in the flow diagram, one skilled in the art will appreciate that assignment processing and tile processing typically occur concomitantly in order to effect synchronization between tile and assignment processing, with the limitation that processing of an assignment job will occur after all tiles corresponding to the assignment job have been processed. Thus, the processes of block 806 may be considered to operate in parallel and independently of the processes in block 804, yet accomplishing synchronization between processing types.

When all bit indicators for those tiles corresponding to the at least one assignment job have been asserted, the resource assignment job is processed as shown in block 808. As an example, the process of block 808 may be carried out by assignment processing unit 420, and may also include implementation of decoding via LLR memory 428 and decoder 430 in an aspect.

Additionally, method 800 may include a determination or check of when all tiles to be processed in a frame have been processed, as shown in decision block 810. Again, it is reiterated that the processes of blocks 804 may run concomitantly with the processes of block 806 as well as block 808. Thus, the check in block 810 is actually a check to determine if the tile processing and the processes of block 804 have been completed for a frame. Accordingly, FIG. 8 shows that if these processes are not yet complete for a frame, the operation of block 804 and tile processing continues as indicated by the loop back from block 810 to block 804. When all tiles have been processed as determined at block 810, the bit indicators are reset as shown in block 812. In the context of the disclosed apparatus of FIG. 4, this equates to the reset of all bit fields in tile processing scorecard 412.

In an alternative, FIG. 8 also illustrates a block 814 where the bit indicators are used to determine which tiles have been processed, as well as which tiles correspond to queued assignment jobs. In other words, the tile processing scorecard 412 is examined to take an accounting of which tiles have been already processed, and those assignment jobs to yet be completed are determined or examined to determine which tiles correspond to queued assignment jobs. This process is performed, in an aspect, by tile processing unit 404 in communication with assignment processing unit 420 (note: this communication connection is not illustrated in FIG. 4). After a current accounting of the bit indicator states is taken and current assignment jobs correlated with their respective tiles in block 814, at least a part of the tile processing of the plurality of tiles may be ordered based on the bit indicator states. This ordering process is performed by tile processing unit 404, and more particularly by tile processing control 410 in order to maximize the time for assignment job processing by looking at which tiles have been tile processed already.

Figure 9:
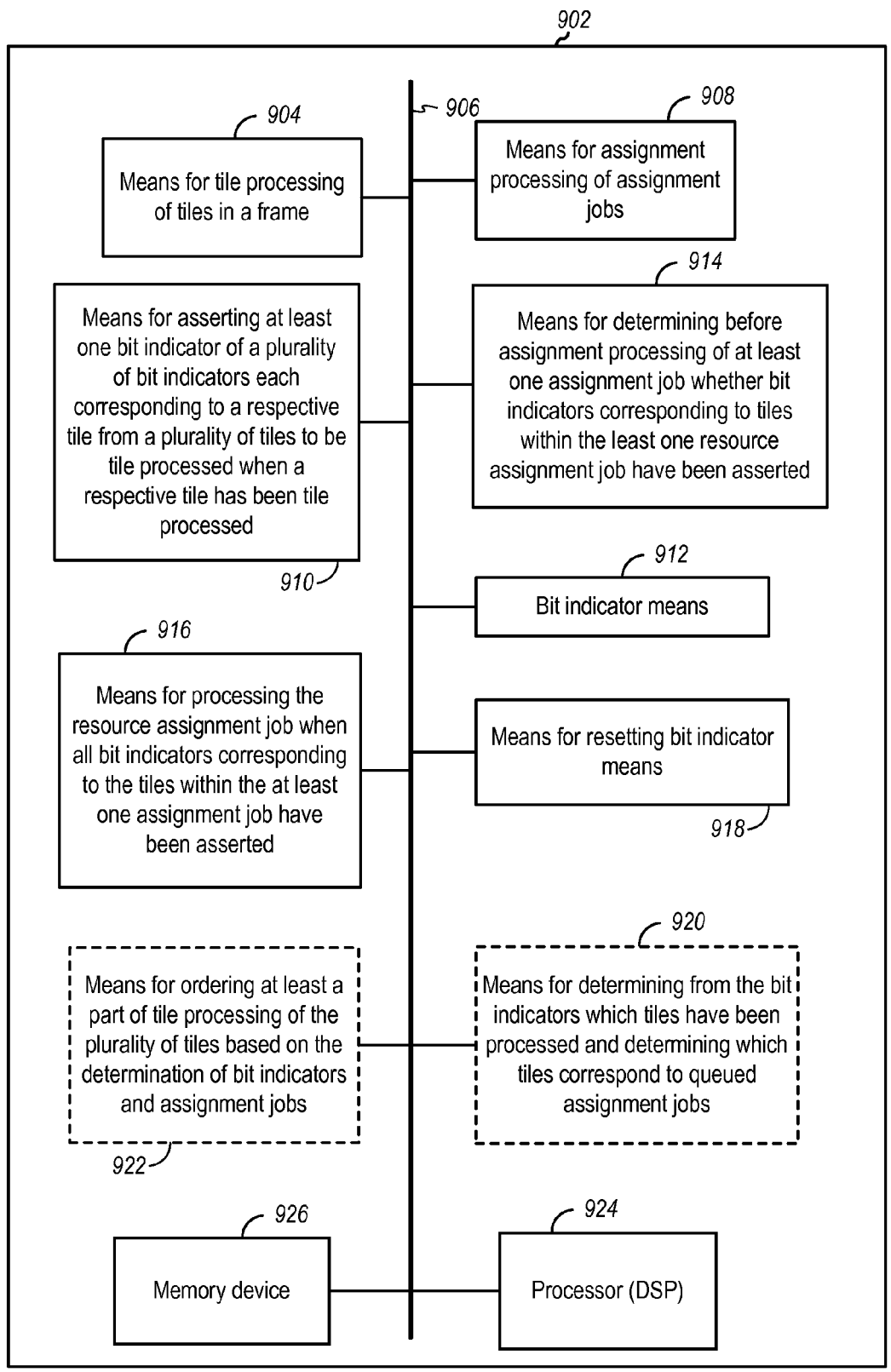
FIG. 9 illustrates another apparatus that may be used for synchronizing tile and assignment processing in a communication device.

FIG. 9 illustrates another apparatus 902 that may be used for coordinating or synchronizing tile and assignment processing in a communication device, such as apparatus 210 or 250 in FIG. 2, or apparatus 400 in FIG. 4. Apparatus 902 includes means 904 for tile processing tiles. Means 904 may be implemented, for example, by the tile processing unit 404, which includes tile processing control 410, channel estimation 406, and MMSE/MRC 408 for processing tiles, and demodulation memory 414 for storing demodulated symbols, or equivalent functional devices. Apparatus 902 also is illustrated with a bus 906, or similarly suitable communication coupling or interface, which serves to illustrate the ability of communication between the various means or devices in apparatus 902.

Apparatus 902 also includes means 908 for assignment processing of assignment jobs. As an example, means 908 may implemented by assignment processing unit 420, which includes assignment node control 422, slicer/LLR 424, and buffer manager 426, or similar functional devices. Means 908 may also be implemented with the inclusion of LLR memory 428, decoder 430, as well as demodulation memory 414.

Apparatus 902 further includes means 910 for asserting at least one bit indicator of a plurality of bit indicators each corresponding to a respective tile from a plurality of tiles to be tile processed when a respective tile has been tile processed. The plurality of bit indicators are within a bit indicator means 912 and are asserted by means 910 via bus 906. It is noted that means 910 may be implemented by tile processing control 410, as an example, or any other equivalent functioning device. In addition, bit indicator means 912 may be implemented by a bit register, such as was described in connection with tile processing scorecard 412, or equivalent device.

Additionally, apparatus 902 may include means 914 for determining before assignment processing of at least one assignment job whether bit indicators corresponding to tiles within the at least one resource assignment job have been asserted. In an aspect, means 914 accesses the bit indicator information in bit indicator means 912 via bus 906. Means 914 may be implementable by assignment node control 422 or another device having the equivalent operability.

Furthermore, apparatus 902 includes means 916 for processing the resource assignment job when all bit indicators corresponding to the tiles within the at least one assignment job have been asserted as is determined by means 914. Means 914 may be implementable by assignment node control 422, slicer/LLR 424 and buffer manager 426, or devices having the equivalent operability. It is also noted that in an aspect means 908 is essentially the same means as means 914, but are broken out separately for description purposes. Thus, means 914 could be subsumed by means 908 and simply considered as one functional block.

Additionally, apparatus 902 also includes means 918 for resetting the bit indicator means 912. As described before, the bit indicators are reset after the tile processing of each frame. Means 918 may be embodied by tile processing control 410, firmware within or external to the tile processing scorecard 412, or some other processor.

Alternative means 920 and 922 may also be included in apparatus 902 to effect a prioritizing or ordering of tile processing based on the asserted bit indicators and the queued assignment jobs. In particular means 920 is a means for determining from the bit indicators in bit indicator means 912 which tiles have been processed and determining which tiles correspond to queued assignment jobs. Means 922 is configured to order, reorder, or prioritize at least a part of tile processing of the plurality of tiles based on the determination of bit indicators and assignment jobs by means 920. Means 920 may be implemented by tile processing unit 404 and tile processing control 410 in unit 404 in conjunction with assignment processing unit 420 and means 922 by tile processing control 410.

Also, it is noted that apparatus 902 may also include a processor, such as a DSP 924, and one or more programmable instructions stored in a storage media or memory device 926 that is executable by the DSP 924 or any of the modules in apparatus 902.

As may be seen by the foregoing disclosure, the disclosed methods and apparatus as disclosed serve to synchronize the modulation or tile-based processing and the assignment-based processing in a communication system. This synchronization affords economization of tile processing, maximization of the independence of tile and assignment processing, and allows for architectures involving multiple modulation or tile processors, as well as multiple assignment or decoder processors for improved performance.

It is noted that the word "exemplary" as used herein, is intended to mean "serving as an example, instance, or illustration." Any examples or aspects described herein as "exemplary" are not necessarily to be construed as preferred or advantageous over other examples or aspects.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

While, for purposes of simplicity of explanation, the disclosed methodologies are shown and described herein as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of interrelated states or events, such as in a state diagram. Moreover, not all illustrated acts may be required to implement a methodology in accordance with the subject methodologies disclosed herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed examples is provided to enable any person skilled in the art to make or use the presently apparatus or methods. Various modifications to these examples will be readily apparent to those skilled in the art, and the generic principles defined herein may be applied to other examples without departing from the spirit or scope of the present disclosure. Thus, the present disclosure is not intended to be limited to the examples shown herein but is to be accorded the widest scope consistent with the principles and novel features disclosed herein.

What is claimed is:

1. A method for communication between tile processing and assignment processing operations in a communication device, the method comprising:
   processing a plurality of tiles among which assignment jobs are divided, wherein at least one assignment job codeword is comprised from at least a portion of the plurality of tiles;
   asserting bit indicators corresponding to respective tiles from the plurality of tiles when the respective tiles have been processed;
   determining during assignment processing of at least one resource assignment job whether bit indicators corresponding to tiles within the at least one assignment job have been asserted; and
   processing the assignment job when all bit indicators corresponding to the tiles within the at least one assignment job have been asserted.

2. The method as defined in claim 1, wherein one or more of the plurality of tiles contain multiple layers.

3. The method as defined in claim 1, wherein the communication device is an OFDM system.

4. The method as defined in claim 1, wherein the communication device is a receiver using MIMO.

5. The method as defined in claim 4, wherein the receiver is configured to receive at least two layers, wherein each layer corresponds to a respective mobile unit and the at least two layers contain at least a portion of tiles having identical frequency and symbol times.

6. The method as defined in claim 1, further comprising:
   resetting the bit indicators at a beginning of tile processing of each frame.

7. The method as defined in claim 1, further comprising:
determining from the bit indicators which tiles have been processed and determining which tiles correspond to queued assignment jobs; and
ordering at least a part of the processing of the plurality of tiles based on the determination of bit indicators and assignment jobs.

8. The method as defined in claim 1, wherein assignment processing includes decoding of the at least one assignment job codeword.

9. The method as defined in claim 1, wherein tile processing includes at least one of demodulation of the plurality of tiles and generation of log likelihood ratios (LLRs).

10. An apparatus for synchronizing tile processing and assignment processing in a communication device, the apparatus comprising:
at least one tile processing unit configured to tile process one or more tiles of a plurality of received tiles;
at least one assignment processing unit configured to process assignment jobs wherein at least one assignment job codeword is comprised from at least a portion of processed ones of the plurality of tiles; and
a tile processing scorecard having a plurality of assertable bit indicators:
wherein each bit indicator in the tile processing scorecard is assigned to a corresponding tile that is processed by the at least one tile processing unit, and is assertable by the at least one tile processing unit when the at least one tile processing unit processes the tile; and
wherein the one or more of plurality of bit indicators are accessible by the at least one assignment processing unit to determine whether particular tiles have been processed by the at least one tile processing unit, such that when tiles associated with an assignment job are determined to have been processed by the at least one tile processing unit, then the at least one assignment processing unit may initiate processing of the assignment job.

11. The apparatus as defined in claim 10, wherein one or more of the plurality of tiles contain multiple layers.

12. The apparatus as defined in claim 10, wherein the communication device is an OFDM system.

13. The apparatus as defined in claim 10, wherein the communication device is a MIMO receiver.

14. The apparatus as defined in claim 13, wherein the receiver is configured to receive at least two layers, wherein each layer corresponds to a respective mobile unit and the at least two layers contain at least a portion of tiles having identical frequency and symbol times and the at least one tile processing unit is configured to demodulate the at least two layers based on MIMO techniques.

15. The apparatus as defined in claim 10, wherein the apparatus is configured to reset the bit indicators at a beginning of tile processing of each frame received by the communication device.

16. The apparatus as defined in claim 10, further comprising:
the at least one tile processing unit configured to:
determine from the bit indicators which tiles have been processed and determining which tiles correspond to queued assignment jobs; and
order at least a part of the processing of the plurality of tiles based on the determination of bit indicators and assignment jobs.

17. The apparatus as defined in claim 10, further comprising:
a decoder configured to decode the at least one assignment job codeword.

18. The apparatus as defined in claim 10, wherein at least one tile processing unit is configured to at least one of demodulate the plurality of tiles and generate log likelihood ratios (LLRs).

19. An apparatus for synchronizing tile processing and assignment processing operations in a communication device, the apparatus comprising:
means for processing a plurality of tiles among which assignment jobs are divided, wherein at least one assignment job codeword is comprised from at least a portion of the plurality of tiles;
means for asserting bit indicators corresponding to respective tiles from the plurality of tiles when the respective tiles have been processed;
means for determining during assignment processing of at least one resource assignment job whether bit indicators corresponding to tiles within the at least one assignment job have been asserted; and
means for processing the assignment job when all bit indicators corresponding to the tiles within the at least one assignment job have been asserted.

20. The apparatus as defined in claim 19, wherein one or more of the plurality of tiles contain multiple layers.

21. The apparatus as defined in claim 19, wherein the communication device is an OFDM system.

22. The apparatus as defined in claim 19, wherein the communication device is a receiver using MIMO.

23. The apparatus as defined in claim 22, wherein the receiver is configured to receive at least two layers, wherein each layer corresponds to a respective mobile unit and the at least two layers contain at least a portion of tiles having identical frequency and symbol times, and the means for processing a plurality of tiles is configured to demodulate the at least two layers based on MIMO techniques.

24. The apparatus as defined in claim 19, further comprising:
means for resetting the bit indicators at a beginning of tile processing of each frame.

25. The apparatus as defined in claim 19, further comprising:
means for determining from the bit indicators which tiles have been processed and determining which tiles correspond to queued assignment jobs; and
means for ordering at least a part of the processing of the plurality of tiles based on the determination of bit indicators and assignment jobs.

26. The apparatus as defined in claim 19, wherein the means for processing the assignment job is configured to decode the at least one assignment job codeword.

27. The apparatus as defined in claim 19, wherein the means for processing a plurality of tiles is configured to at least one of demodulate the plurality of tiles and generate log likelihood ratios (LLRs).

28. A computer program product, comprising:
computer-readable medium comprising:
code for causing a computer to process a plurality of tiles among which assignment jobs are divided received by a communication device operable in a communication system, wherein at least one assignment job codeword is comprised from at least a portion of the plurality of tiles;

code for causing a computer to assert bit indicators corresponding to respective tiles from the plurality of tiles when the respective tiles have been processed;

code for causing a computer to determine during assignment processing of at least one resource assignment job whether bit indicators corresponding to tiles within the at least one assignment job have been asserted; and code for causing a computer to process the assignment job when all bit indicators corresponding to the tiles within the at least one assignment job have been asserted.

29. The computer program product as defined in claim 28, wherein one or more of the plurality of tiles contain multiple layers.

30. The computer program product as defined in claim 28, wherein the communication system is an OFDM system.

31. The computer program product as defined in claim 28, wherein the communication device is a receiver using MIMO.

32. The computer program product as defined in claim 31, wherein the receiver is configured to receive at least two layers, wherein each layer corresponds to a respective mobile unit and the at least two layers contain at least a portion of tiles having identical frequency and symbol times.

33. The computer program product as defined in claim 28, further comprising:

code for causing a computer to reset the bit indicators at a beginning of tile processing of each frame.

34. The computer program product as defined in claim 28, further comprising:

code for causing a computer to determine from the bit indicators which tiles have been processed and determining which tiles correspond to queued assignment jobs; and code for causing a computer to order at least a part of the processing of the plurality of tiles based on the determination of bit indicators and assignment jobs.

35. The computer program product as defined in claim 28, wherein assignment processing includes decoding of the at least one assignment job codeword.

36. The computer program product as defined in claim 28, wherein tile processing includes at least one of demodulation of the plurality of tiles and generation of log likelihood ratios (LLRs).

* * * * *